US011262066B2

(12) United States Patent
Schlederer et al.

(10) Patent No.: US 11,262,066 B2
(45) Date of Patent: Mar. 1, 2022

(54) STAGGERED FIRING

(71) Applicant: FLORADRY GMBH, Munich (DE)

(72) Inventors: Swantje M. Schlederer, Grafing (DE);
Thomas Steer, Freising (DE); Hans
Werner, Munich (DE)

(73) Assignee: FLORADRY GMBH, Munich (DE)

(*) Notice: Subject to any disclaimer, the term of this
patent is extended or adjusted under 35
U.S.C. 154(b) by 129 days.

(21) Appl. No.: 16/321,198

(22) PCT Filed: Jul. 26, 2017

(86) PCT No.: PCT/EP2017/068825
§ 371 (c)(1),
(2) Date: Jan. 28, 2019

(87) PCT Pub. No.: WO2018/019861
PCT Pub. Date: Feb. 1, 2018

(65) Prior Publication Data
US 2019/0162405 A1 May 30, 2019

(30) Foreign Application Priority Data

Jul. 28, 2016 (DE) .................... 10 2016 213 954.1

(51) Int. Cl.
F23G 5/00 (2006.01)
F23L 15/04 (2006.01)
(Continued)

(52) U.S. Cl.
CPC .............. F23G 5/006 (2013.01); F23G 5/04
(2013.01); F23G 5/30 (2013.01); F23G 5/40
(2013.01);
(Continued)

(58) Field of Classification Search
CPC ...................................................... F23G 5/006
(Continued)

(56) References Cited

U.S. PATENT DOCUMENTS 4,232,614 A * 11/1980 Fitch .................. F23G 5/04
110/224
H5 H * 12/1985 Mukherjee ............... 60/39.182
(Continued)

FOREIGN PATENT DOCUMENTS

CN 104976622 A 10/2015
DE 10143427 A1 3/2003
(Continued)

OTHER PUBLICATIONS

International Search Report for International Application No. PCT/EP2017/068825, dated Oct. 25, 2017.

Primary Examiner — Avinash A Savani
(74) Attorney, Agent, or Firm — Marshall, Gerstein & Borun LLP

(57) ABSTRACT

The invention relates to a staggered firing for combustion of wet charge materials, consisting of the following steps: pre-combustion designed as a fluidized bed firing, heat transition in a heat exchanger, dust precipitation, and post-combustion. The staggered firing is characterized in that during the heat transition in the heat exchanger, exhaust gases from the pre-combustion are cooled and combustion air for pre-combustion is heated and then supplied to the pre-combustion.

13 Claims, 1 Drawing Sheet

(51) Int. Cl.
  *F23G 5/04*    (2006.01)
  *F23G 5/30*    (2006.01)
  *F23G 5/40*    (2006.01)
  *F23G 5/46*    (2006.01)
  *F23G 7/00*    (2006.01)
  *F23G 7/10*    (2006.01)

(52) U.S. Cl.
  CPC ............... *F23G 5/46* (2013.01); *F23G 7/001* (2013.01); *F23G 7/10* (2013.01); *F23L 15/04* (2013.01); *F23G 2201/101* (2013.01); *F23G 2202/103* (2013.01); *F23G 2206/10* (2013.01); *F23G 2900/00001* (2013.01); *F23J 2217/10* (2013.01); *Y02E 20/34* (2013.01)

(58) Field of Classification Search
  USPC ...................................................... 431/215, 7
  See application file for complete search history.

(56) References Cited

U.S. PATENT DOCUMENTS

| | | | | |
|---|---|---|---|---|
| 4,656,972 A | * | 4/1987 | Shimoda | ................. F23C 9/003 110/204 |
| 5,222,446 A | * | 6/1993 | Edwards | ............... B09B 3/0075 110/211 |
| 5,311,830 A | * | 5/1994 | Kiss | ........................ C10B 53/00 110/223 |
| 2011/0179981 A1 | * | 7/2011 | Van Naarden | .......... C10L 5/445 110/219 |

FOREIGN PATENT DOCUMENTS

| | | |
|---|---|---|
| DE | 102006053337 A1 | 5/2008 |
| DE | 102014106901 A1 | 11/2015 |
| EP | 1161312 A1 | 12/2001 |
| EP | 2749362 A1 | 7/2014 |
| WO | WO-0018524 A1 | 4/2000 |

\* cited by examiner

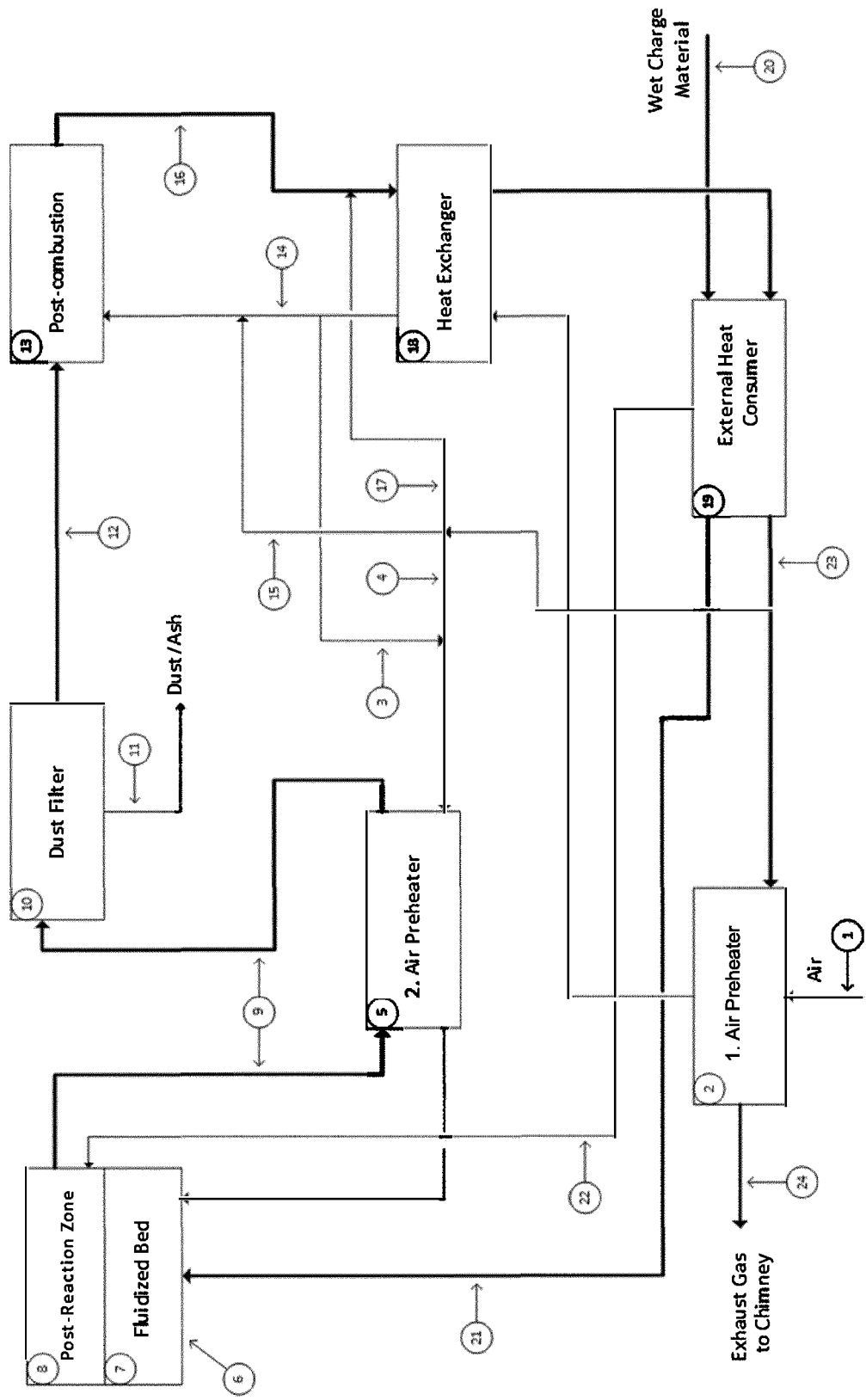

STAGGERED FIRING

CROSS-REFERENCE TO RELATED APPLICATIONS

This is the United States national phase of International Patent Application No. PCT/EP2017/068825, filed Jul. 26, 2017, which claims the priority benefit of German Application No. 10 2016 213 954.1, filed on Jul. 28, 2016. The entire contents of each of the foregoing are incorporated herein by reference.

FIELD OF THE DISCLOSURE

The invention relates to a staggered firing for the combustion of wet charge materials with a pre-combustion system in the form of a fluidized bed firing and a post-combustion system, in which the required calorific value of the charge materials is reduced to a minimum by means of a heat exchanger.

BACKGROUND

Wet substances with a high organic content are frequently found in industry as products or by-products of processes. The aim is always to use these substances energetically or at least to minimize the amount of substance to be disposed of. In most cases, they are dried beforehand. This becomes particularly demanding when drying is a necessary process step in order to use the then drier material energetically in a further step, and when the wet material does not have sufficient energy of its own to maintain combustion without external heating without upstream drying. Furthermore, the requirements increase when the plants become smaller in the output range. For such requirements, the prior art often offers no or no satisfactory solutions, especially if they can no longer manage without external support energy.

This is particularly the case with sludges and in particular with sewage sludge, as well as with fermentation residues.

In the case of sewage sludge, the problem arises that mechanical dewatering is possible up to a maximum solids content of approx. 25%. For combustion, a solids content of at least 40% is generally required. The combustion plants used for this purpose cannot provide the heat for drying the sludge from 25% to 40% dry matter, so that external heat or, more generally, external energy by co-firing expensive primary fuels is always required in order to maintain the process.

The adiabatic combustion temperature of wet charge materials is too low to achieve sufficient temperature for clean combustion.

As a remedy it would be necessary to transfer the exhaust gas heat of the exhaust gases after combustion at high temperature to the combustion air before entering the combustion chamber, in order to raise the temperature level of the combustion. However, this is forbidden, as the exhaust gases after combustion are usually aggressive and would attack the metal surface of a heat exchanger. A permanent operation of such a heat exchanger is not possible.

The combustion of solids generally requires a relatively high excess of air, which further reduces the heat available for drying. The usable heat is no longer sufficient to provide the drying heat, even on balance. Additional energy is required to dry the sewage sludge.

For this reason, no technology with small and decentralized plants is known so far. The state of the art today is the collection of any mechanically dewatered sewage sludge from a large number of sewage treatment plants to a large, central and stationary recycling plant as fluidized bed firing as mono-combustion, usually with a performance of more than 20 MW, or as co-combustion in large coal-fired power plants with a typical combustion performance of 500-2,000 MW. Such plants combine all sewage treatment plants of several counties.

Such plants are often designed as stationary fluidized beds. Such combustions are known, as for example described in Wikipedia under the keyword "fluidized bed firing." They are used in a variety of large-scale technical applications in the output range above 10 MW, especially in power plants for power generation or in waste incineration plants or for the combustion of thermally dried sewage sludge. In these plants, exhaust gas treatment takes place at the end of the cooling process or the use of the heat contained in the exhaust gases at a temperature of around 150-200° C., usually with a fabric filter, rarely with an electrostatic precipitator. The principle of these combustions is based on the combustion of comminuted fuel in a fluidized bed of hot bed material, for example quartz sand; the typical grain size of quartz sand or other bed material is approx. 0.8-1 mm equivalent diameter. The bed material can be doped with other materials to promote or prevent individual reactions. The fuel and the bed material are held in suspension together by adding a fluidizing medium, e.g. air or steam, and thus fluidized. The comminuted fuel particles have a large surface, so that a good combustion can take place. The fluidization of the bed material results in a very good impulse and heat exchange, so that an essentially uniform temperature prevails in the fluidized bed. The bed material impresses this temperature on the fuel mass flow introduced as the reaction temperature. The temperature of the bed material can be determined by the system control. The formation of harmful gases, in particular nitrogen oxides, can be kept low. In large-scale plants in the prior art, the pre-combustion zone (fluidized bed) and the after-burning zone (rear light) border directly on each other. Combustion of the fuels takes place all at once, i.e. without external heat being added to the exhaust gas again at any point or heat being extracted in a chemically non-reactive area. The precipitation of dust takes place at the end of combustion.

DE 101 43 427 A1 describes a device for the thermal utilization of biological substances in which various biological materials are combined to form a mixture with a defined calorific value and gasified in a stationary fluidized bed. The device can be preceded by pre-drying of the fuel by waste heat from combustion. The main focus of the invention is the purification of the combustible gases produced during gasification from long-chain hydrocarbons (tars) by washing with an organic washing liquid (oil) and the use of the oil loaded with tars as ignition oil in a pilot injection engine, in which the combustible gas is also to be burnt. This plant is used for the production of product gas and not primarily for the drying of moist material. This description does not contain any statement on the integration of the possible predrying with the carburetor.

Another combustion concept is known from DE 10 2006 053 337 A1. This publication describes an arrangement for the co-combustion of biomass and organic waste in a pulverized coal firing system for the generation of steam. In order to operate the associated dryer for the supplied moist secondary fuels, part of the exhaust gas stream from the combustion is decoupled and fed to a heat exchanger, which is connected to the dryer. Due to the use of several different fuels, the plant described in DE 10 2006 053 337 A1 is complex, especially as it is used to generate steam and is not specifically designed for drying biomass or sewage sludge.

An essential feature of this plant is that the heat balance in the combustion is determined by the primary fuel. The water content of the secondary fuel and thus the amount of vapors in relation to the energy content of the secondary fuel are irrelevant. The tasks of a thermodynamic integration do not arise with this procedure and are therefore naturally also not solved.

DE 10 2014 106 901 A1 describes a gasifier and process for producing a combustible gas from carbonaceous charge materials. The invention describes in detail a possible process sequence in the gasifier. The exhaust gases from the gasifier are cooled prior to gas purification (dust precipitation) solely for the purpose of controlling the material temperatures in gas purification that are usually below the operating temperature of the gasifier. Water vapor can be added to the combustion air. An admixture of recirculated exhaust gas is not intended.

GENERAL DESCRIPTION

The invention is based on the task of creating a staggered firing with a stationary fluidized bed firing of the type mentioned at the beginning, in which moist material can be used, with the essential characteristic according to the invention that charge materials can still be used with a considerably higher water content and a considerably lower calorific value than is possible up to now with the prior art and the plant is nevertheless energy self-sufficient.

The task is solved by staggered firing according to claim 1. Preferred further embodiments of the inventive staggered firing result from the following subclaims.

The representation of the invention is essentially made for the charge material "sewage sludge," since here the experience and the prior art are clearest in order to present the invention. However, it is also intended for all other charge materials mentioned below, such as fermentation residues, leaves, grass cuttings, algae, water hyacinths, waste from the food industry, even if this is not mentioned separately in each individual case below.

The object of this invention is a process which makes it possible to utilize wet charge materials after mechanical dewatering by means of a mobile, decentralized, bubble-forming fluidized bed firing in such an energetic way that no external heat or external energy is required to maintain the process. In the inventive method the size of the plant is based on the need for the decentralized accumulation of wet charge materials, e.g. the size of a single sewage treatment plant. For example, a plant with a capacity of 300 kW is suitable for a sewage treatment plant with an annual production of approx. 3,000 t of mechanically dewatered sludge, which corresponds to a municipality with approx. 4,000 inhabitants. According to the prior art, a sewage treatment plant of this size cannot recycle the accumulating sewage sludge itself, but must—after possible interim storage—take it to central recycling plants and still pay for the takeover. The use of the invention-based plant not only saves the costs for interim storage, transport and disposal, but also produces a mineral fertilizer with a high phosphorus content, which represents a positive financial value. Decentralized, small-scale material cycles enjoy a much higher acceptance among the population than centralized large-scale plants, so that only through the decentralized accumulation of the fertilizer can an acceptance also be achieved in the using agriculture.

If necessary, the system still generates usable excess heat.

The maximum size of the mobile plant is limited to approx. 3 MW.

If pre-drying of the wet charge material outside the fluidized bed firing should become necessary, this is done according to the invention with the waste heat contained in the waste gas of the fluidized bed firing without the supply of heat from outside.

An essential feature of the overall plant is that after the mechanical dewatering of biomass or sludges, as mentioned above, no thermal drying is required outside the fluidized bed firing and a possibly integrated dryer.

The invention is naturally also scalable to large plants, which are of course no longer mobile.

According to the invention, the wet charge material, alone or mixed with dried charge material, is first applied to a fluidized bed of hot sand (stationary or bubble-forming fluidized bed). The bed of hot sand is exposed to hot combustion air of several hundred degrees, preferably above 200° C., optimally above 400° C. According to the invention, this also occurs in the power range below 3 MW combustion capacity, more precisely below 1 MW combustion capacity. In accordance with the invention, this also takes place in mobile, decentralized plants.

The amount of air—mixed with exhaust gas from the combustion—contains exactly the amount of oxygen required to maintain the temperature of the sand bed by partially burning the wet charge material. The operating temperature of the fluidized bed can be adjusted at will over a wide range. When using fuels with a low ash softening point, e.g. straw, an operating temperature below the ash softening point can be selected so that ash softening is safely avoided. After leaving the fluidized bed, a further partial flow of hot air may be blown into the exhaust gases, as may the vapors from the drying process. The wet, solid fuel is converted into a gaseous fuel with a low calorific value. The fluidized bed and the downstream combustion chamber comprise the pre-combustion. After pre-combustion, the exhaust gas contains, in addition to nitrogen from the air, the combustible components carbon monoxide (CO), hydrogen ($H_2$), various hydrocarbons ($C_mH_n$) and the combustion products carbon dioxide ($CO_2$) and water vapor ($H_2O$). The exhaust gas temperature at the exit of the reactor is approx. 700° C. This is the equilibrium temperature that occurs between CO—$H_2O$ and $CO_2$—$H_2$ due to the shift reaction. The use of hot combustion air in the fluidized bed increases its energy input and accordingly reduces the required energy input from the fuel required to maintain the energy balance in the fluidized bed of pre-combustion. This allows the required minimum calorific value of the fuel to be reduced advantageously. At a fluidized bed temperature of 700° C., combustion air of 200° C. must be heated by a total of 500 K, while at a combustion air temperature of 500° C. heating of 200 K and thus around 40% of the required heat is sufficient. The maximum permissible water content in the fuel can thus be increased from 62% to 75%, and the minimum required calorific value falls accordingly from 4,000 to 1,500 kJ/kg. According to the prior art, sewage sludge can be dewatered mechanically to approx. 27% solids content or 73% water content, but not to 38% solids content or 62% water content. The direct use of mechanically dewatered sewage sludge is therefore only possible in the plant according to the invention. The same applies analogously to all wet biomass or sludge, etc.

The residual carbon content of the ash can be specifically adjusted by adjusting the air supply to the pre-combustion. The process is therefore also suitable for the production of carbonaceous fertilizers, which are becoming increasingly important in the discussion about soil protection and humus conservation. The ash could also be used as activated carbon in technical plants.

Some typical features of fluidized bed firing are modified to illustrate the process in the low power range. For example, instead of a bed material with about 1 mm medium diameter, a material with less than 0.5 mm is used, which reduces the required construction height and only enables the mobilization of the plant.

In the case of the inventive mobile, decentralized, bubble-forming fluidized bed (output range less than 3 MW), the fluidized bed remains in the combustion chamber. The ash and the bed dust can be removed from the bottom of the combustion chamber with the aid of the bed fume hood. However, after they have been ground small and are carried along with the exhaust gas, separation by downstream separators is common. According to the invention, the precipitation of dust from the exhaust gas takes place BEFORE the completion of the combustion and AFTER a heat extraction from the exhaust gas, whereby the extracted heat is supplied to the combustion air for the pre-combustion and heats it. Particularly advantageous is the cooling of the exhaust gases to at least 200° C., but preferably to at least 400° C., in accordance with the invention, with simultaneous heating of the combustion air, which is fed to the pre-combustion process. The heating of the combustion air for pre-combustion reduces the required conversion of chemically bound energy of the fuel into sensible heat in the exhaust gas: With stoichiometric combustion, ash-dry fuels have about the potential to heat the exhaust gas by about 1,700 K. If the combustion is operated with excess air, the heating potential decreases accordingly. Excess air of 1.4, for example, reduces the range to around 1,300 K. If the fuel also contains water, this value is further reduced, because the water contained in the fuel also evaporates during combustion and the released water vapor must be heated up further. To make matters worse, the water vapor has up to twice the heat capacity as exhaust gas, so that the possible heating drops much faster than with a pure increase in excess air. At a water content of, for example, 60% in the fuel, the heating-up span drops to 850 K. With a water content of 75%, the value drops to 530 K. With this low heating-up span, the prior art no longer permits proper control of the combustion.

The objective of the invention is to reduce the required release of chemically bound energy in the pre-combustion to a minimum in order to permit the highest possible water content in the fuel when it is fed into the pre-combustion, using the then excess chemically bound energy. This is achieved on the one hand by implementing two-stage combustion. In the first stage, combustion takes place with an air ratio of less than 1; the theoretically possible heating span for dry fuel then corresponds to that for stoichiometric combustion, since—in a first approximation—the part of the chemically bound heat which is released corresponds to the part of the air which is supplied in relation to stoichiometric combustion. In a first approximation, the heating span is therefore independent of the degree of hypostoichiometry in the case of hypostoichiometric operation. Secondly, this is achieved by heating the combustion air to as high a temperature as possible before it enters the pre-combustion stage. The pre-combustion typically takes place at a temperature of 700° C. If the supplied combustion air could now be preheated to 700° C., it would—in a first approximation—be sufficient to release the amount of chemically bound energy required to evaporate the water in the fuel and to heat up the water vapor to 700° C. The aim of the invention is to preheat the combustion air to the operating temperature of pre-combustion as far as possible.

The combustion air in the fluidized bed basically has TWO functions. The first it is to provide the oxygen that is required to provide the heat that keeps the bed temperature constant through oxidation of the fuel. The second essential function is to fluidize the fluidized bed. Fluidization always requires a minimum amount of air to be blown into the fluidized bed. According to the invention, the combustion air is mixed with recirculated exhaust gas with a low oxygen content in order to be able to adjust the oxygen content independently of the amount of air supplied.

Many types of fuels can be used as fuels in fluidized bed firing according to the invention. Several different fuels can be used at the same time, which makes this type of combustion very flexible. Solid, liquid and gaseous fuels can be used in any mixture without the need for a premix. The mixture takes place independently through the fluidized bed, even if the fuels are added spatially separated. In the operation of the inventive dryer, it is advantageous that a mixture of material to be dried or dried can be fed to the combustion, whereby the mixture also includes the ratio "0" to "100" for both the wet and the dry portion.

For example, primary biomasses such as grass clippings, leaves, shrub clippings, woody or herbaceous material, algae from fresh, salt and brackish water, water hyacinths, jatropha nuts with all parts and by-products, such as straw and chaff from cereals, spelt from the grinding of cereal grains, rice husks, etc. are conceivable as fuels. Biomasses are also conceivable after first use, such as fermentation residues, spent grains, waste from food production or food waste, to name just a few examples; the diversity can be seen if one takes a closer look: the production of ketchup, for example, produces tomato herb as waste, the production of baby food produces carrot peels, the production of fruit salad produces many citrus fruit peels, the pressing of olive oil produces olive press cakes and olive stones, the production of sugar from sugar cane produces bagasse. Furthermore, all substances are conceivable, which accumulate as excrements of living beings. This ranges for example from sewage sludge to animal manure, e.g. from chickens or horses, cows or pigs or other animals, with or without litter. There are also many industrial sludges that can also be used. These include, for example, sludges from waste paper treatment and waste water treatment in paper mills, oil sludges, sludges from tanneries and other branches of industry.

An essential advantage of the fluidized bed used according to the invention is that the fuel is in a moving bed. Fuel and combustion air are homogeneously distributed through the sand bed. In the fluidized bed, there is approx. 98-99% sand and only approx. 1-2% fuel. The sand determines the reaction temperature in the fluidized bed; it provides the necessary energy to activate the reactions and absorbs the energy released during the reactions without changing its temperature significantly.

With other combustion systems, the problem is basically that the combustion air flows along where there is little or no fuel; there are therefore zones with roughly different ratios of fuel to air. This then leads to a very uneven reaction with poor quality and homogeneity of the exhaust gases and, especially where air and fuel are present in almost stoichiometric ratios, to very high local combustion temperatures with a strong tendency to slag formation. Basically, the other prior art combustion systems require a high excess of air in order to be able to provide sufficient oxygen even at the points with an unfavorable distribution of air and fuel. This reduces the efficiency and is also unfavorable with regard to the avoidance of harmful gas components in the exhaust gas. Either a considerable amount of carbon monoxide (CO) and organic carbon (TOC) remains due to insufficient oxygen, or a considerable amount of nitrogen oxide is produced due to excess oxygen and excessively high local temperature peaks. A particular disadvantage is that both can occur in parallel at different locations of such a combustion system. The inventive stationary fluidized bed firing ensures an optimum ratio between fuel and air at every point of the fluidized bed and thus avoids the disadvantages of other combustion systems with regard to prior art emissions inherent to the system. Excessive air preheating is possible because the combustion temperature is determined by the temperature of the sand bed and temperature peaks are not possible either downwards or upwards.

An essential characteristic of the fluidized bed firing according to the invention is that the combustion air is preheated to at least 200° C., preferably to at least 400° C. The heating is preferably carried out in at least two stages. The first stage in this case would be heating using the waste heat contained in the exhaust gas upstream of the chimney, the second stage directly in countercurrent with the exhaust gas from pre-combustion. If necessary or advantageous, a third stage can also be added as an intermediate stage where heat from the exhaust gas is used BEFORE external use. In combustion systems without a fluidized bed, air preheating is usually prohibited, as the combustion air is required cold in order to sufficiently cool the components on which the solid combustion embers are located. The possibility or impossibility of high air preheating has a decisive influence on the efficiency of a plant.

The exhaust gas from the pre-combustion represents the now gaseous fuel. According to the invention, it is cooled in heat transfer with the combustion air for pre-combustion. The guidance of the dust-containing gases in the heat exchanger takes place according to invention inclined or vertically from above to downward, so that all dust contained in the gas passes the heat exchanger by the force of gravity alone, without the gases having the task to ensure the transport of the dust. Such a heat exchanger is not used in the prior art in large plants, as it cannot be designed or the exhaust gases are completely oxidized and thus the heat exchanger would corrode. The design according to the invention with the vertical, downward leading pipe for the dust-laden exhaust gases is exclusively suitable for the small power range. In large plants, the combustion air in the prior art is supplied at less than 200° C. in state-of-the-art technology, which is very detrimental to the overall thermal process.

In accordance with the invention, the flammable gas, cooled down to approx. 450° C., is directly transferred to another reactor in which the dust is retained (filter unit). In a fluidized bed firing system in accordance with the invention, the dust is separated after the solid components of the fuel—except for the remaining ash—are transferred into the gas phase; it is sufficient to feed only the quantity of oxygen to the fluidized bed required to maintain the temperature of the fluidized bed. The transfer of the solid fuels into the gas phase takes place automatically at the temperature of the fluidized bed. Optimally, the exhaust gases are only cooled in a heat exchanger against the fresh air to the fluidized bed ($2^{nd}$ preheating stage), before they reach the dust precipitator at a temperature of at least 450° C. The dust precipitator is made of ceramic materials or sintered metals in accordance with the invention. The individual elements are candle-shaped. The candles are vertically installed, firmly closed at the bottom and provided only at the upper end with an opening. The dust-laden gas flows through the candle from the outside to the inside and leaves the candle through its opening on the upper side. The dust adheres to the outside of the candle. The cleaning of the dust from the candle takes place by a brief reversal of the flow with dust-free inert gas. The inert gas, preferably nitrogen, carbon dioxide, carbon monoxide or water vapor, which now flows through the candle from the inside to the outside, takes the dust particles adhering to the outside with it. The dust particles then fall into the collection funnel located below the candles. The combustible gas is thus cleaned of dust and leaves the reactor technically dust-free. The dust is discharged via a sluice. The sluice is designed in such a way that an intrusion of oxygen-containing air is safely avoided.

The filter is advantageously designed as a multi-chamber system with online cleaning, in which for cleaning purposes during operation either individual chambers are switched off or cleaning is even carried out by means of countercurrent without switching off individual chambers. According to the invention, it is thus possible to realize plants with a capacity of less than 3 MW even in the low power range, which are both continuously operable and comply with the emission qualities of large plants.

If the gas cleaning is to be arranged only after the combustion has been completed, it would preferably be arranged only after the use of the heat contained in the exhaust gas in order to work in the lower temperature range.

The dust-like ash separated in the filter unit at high temperatures contains a very low proportion of heavy metals, since most of these are still present in vapor form. According to the invention, this ash is particularly suitable for the use of the contained minerals and, especially in the case of the use of sewage sludge, especially for the further use of the phosphorus contained in the sewage sludge, either by extraction or by direct use of the sewage sludge ash.

According to the invention, it is particularly advantageous that the ash is separated before complete oxidation. This also reduces the oxidation of the phosphorus to a minimum, which significantly increases the direct availability of the phosphorus from the ash for biological fertilization purposes. In the case of mono-combustion in large prior art plants, dust precipitation always takes place AFTER complete combustion and at temperatures below 200° C., so that the advantages of the plant according to the invention cannot be gained in those plants.

The worldwide forecasts for available raw materials point to a shortage of phosphorus, so that the recycling of phosphorus from sewage sludge plays a key role. The plant according to the invention can contribute to this by specifically separating the ash and making the phosphorus contained in it usable in further material cycles.

For the heavy metals still contained in the exhaust gas, a targeted condensation trap may be installed in accordance with the invention. The heavy metals are separated in this condensation trap and then no longer represent a contamination of the ash, but are present—separately from the ash—in concentrated form and can be returned to the material cycle.

After the dust precipitator, the complete oxidation of the exhaust gases (post-combustion) takes place in a further combustion chamber in accordance with the invention. Oxidation preferably takes place in the form of a multiple addition of a partial stream of combustion air, preferably in a 4-step air supply, but at least in a 2-step air supply. This allows the emissions of nitrogen oxides to be significantly reduced, as in all sections, with the exception of the last oxygen deficiency prevails, and in the case of oxygen deficiency nitrogen prefers to react to molecular nitrogen and not to nitrogen oxide. Since the gas no longer contains dust, it can be burned with very little excess air, similar to the conditions for using natural gas. The combustion quality in terms of emissions thus also corresponds to the level of natural gas. Emissions from the combustion of natural gas are considerably lower than those from solid fuel combustion systems using the prior art. The usable heat of the gas or the originally used fuel is thus maximized.

According to the invention, this circuit allows the production of a dust-free exhaust gas from solid fuel at a typical temperature of 950° C. as stated above. In contrast to the prior the art, the absence of dust is an essential quality feature and, in accordance with the invention, allows the downstream heat recovery to be carried out in a way that is otherwise reserved for the use of natural gas. The inventive system can therefore be used, for example, to provide heating surfaces with finned tubes without any risk of contamination. Likewise, complex devices for cleaning even bear-tube heating surfaces from dust can be omitted. Furthermore, the overall height of heat exchanger bundles is no longer limited to the penetration depth of the cleaning devices. Higher exhaust gas velocities can also be permitted without incurring the risk of pipe erosion.

In accordance with the laws on air pollution control and waste incineration applicable in the various countries, the combustion quality allows waste to be used as fuel in the plant in compliance with all applicable regulations, like for example the use of contaminated waste wood in Europe is subject to EU 2000/76 regulations. In this case, the plant would be operated in such a way as to ensure compliance with the minimum combustion temperature after the last addition of air. For the first time, the inventive technology allows the use of this waste in small plants under 3 MW. The prior art does not permit this, since only steam is used as the working medium and no economic work can be set up and operated for this in the output range below approx. 10 MW.

After post-combustion, the heat contained in the exhaust gas can be used to operate the dryer of the fuel, according to the invention, for wet fuels. As a rule, not all the heat contained in the exhaust gas is needed to operate the dryer. The excess heat can—before or after heating the dryer—be used in a suitable thermodynamic circuit to provide external heat and/or to generate electrical energy. Since the gas is dust-free, a Stirling engine, for example, which has the highest thermodynamic efficiency, but whose heat exchanger—due to the process—is very quickly clogged with dusty exhaust gases and cannot be cleaned, can be used or is advantageous. Preferably, this can be done according to the invention in such a way that the waste heat is first used to generate electrical energy, advantageously for example by means of an ORC system, a steam engine or a Stirling engine. The combustion chamber of a working machine could also be used directly as a combustion chamber, preferably that of a gas turbine. Accordingly, the remaining waste heat would then be used for drying. If no drying heat is required, the use of the heat contained in the exhaust gas could also be limited to the generation of electrical energy or coupled with other use of the waste heat, e.g. in a district heating network.

The exhaust gases can be cooled to any temperature before use by mixing with cooled exhaust gas after use. In the case of a Floradry contact dryer described in the parallel application filed by the applicant on the same day, this would for example be the temperature of 400° C., which should not be exceeded as the inlet temperature. A steam engine or an ORC system is often designed for an inlet temperature of around 550° C., as this corresponds to the normal exhaust gas temperature of a CHP unit. This temperature can be easily adjusted with the inventive plant. Adjustments to the units to use the heat contained in the exhaust gas can thus be avoided, which saves considerable effort and investment costs. This circuit is only possible because, according to the invention, the exhaust gas is drawn off directly after the unit for recirculation and the heat still present in the exhaust gas to the chimney can be used to preheat the combustion air. The total amount of recirculation gas can be up to 10 times the amount of exhaust gas to the chimney.

With a water content of more than 75% in the fuel, it can be advantageous to heat the combustion air with energy from the exhaust gas after post-combustion. It should also be noted that the exhaust gases after post-combustion always contain residual oxygen. This oxygen can corrode heating surfaces, if the exhaust gas promotes this, as is the case, for example, if sufficient chlorine is contained in the fuel. The possible preheating temperature of the combustion air from the post-combustion energy is therefore usually limited to a value below 350° C.

If the fuel has a water content of more than 70%, it is advantageous to use part of the usable heat of the exhaust gases to pre-dry the fuel. The preferred design of the invention is that the dryer has a flow-through connection or coupling between the outlet of the heat exchanger for the dried material and the combustion operated at underpressure, via which steam generated during drying is sucked into the combustion. Preferably, a dryer is integrated into the plant, whose vapors enter the combustion and are cleaned there. In this way, fuels with a water content of around 85% can also be used.

According to the invention, the dryer is preferably designed with a high degree of efficiency, as a so-called contact dryer. A convection dryer requires so much diluting air in the vapors that the use of the vapors as combustion air is excluded, since the required capacity of the combustion would be far above the heat requirement of the convection dryer. A convection dryer is not suitable for integrated combination with a combustion. A contact dryer and in particular the Floradry contact dryer do not require any air, so that the vapors are not diluted with air—except for a small proportion of false air. The use of a contact dryer reduces the amount of false air introduced into the dryer to a minimum and maximizes the tolerance of the system with regard to the maximum permissible water content in the wet fuel. The vapors generated during drying are used directly in the furnace in accordance with the invention.

According to the invention, the contact dryer can be realized particularly easily, if the exhaust gases are cooled to below 400° C. by exhaust gas recirculation before entering the dryer. This considerably simplifies the safety requirements for the contact dryer. According to the invention, of course, any temperature other than the inlet temperature to the units for using the heat contained in the exhaust gas is also conceivable.

The contact dryer ensures an efficient heat transfer to the material to be dried and a high throughput of the dryer. It is preferred that the contact dryer is designed as an indirect dryer with steam as the heat transfer medium. It would be advantageous to arrange the drying pipes in an upper area, in which the material to be dried is conveyed by means of a conveying device such as a soulless screw. When the drying pipes are heated, the steam condenses on the outside of the pipe wall and drips downwards. The heating pipes are arranged in a lower area, in which the exhaust gases transfer the heat to water, which evaporates as a result; the steam rises upwards into the area of the drying pipes and thus closes the cycle of a natural circulation steam generator with integrated condenser.

The drying and heating areas are advantageously enclosed by a common cylindrical jacket, which also absorbs the force from the pressure of the steam. The material to be dried is in contact with the inner wall of the surrounding drying tube and is conveyed in its longitudinal direction. In the heating sector it can also be advantageous not to let the exhaust gases flow through, but around the pipes and to provide the pipes with fins. In this case, the heating pipes would be arranged outside the jacket and connected to it by at least one pipe; however, the heating pipes are always arranged below the drying pipes.

The decentralized, small-scale system also makes it possible to combine the plant with already existing energy systems at one location. For example, the mechanically pre-dewatered fermentation residues of a biogas plant can be used as charge material in the fluidized bed firing and the exhaust gas can be added to the biogas for use in the piston engine after dedusting. In this case, the installation site of the plant would be the location of the biogas plant. If the installation site is a food processing plant, the food waste from production can be used as charge material for the fluidized bed firing and the exhaust gas can be burned after dedusting in a steam boiler, which is usually installed there. As far as the disposal of biomass as described above is concerned, it is also advantageous to set up the plant at a location in the relevant disposal area, where the heat or the waste gas can be used directly. This also includes the fact that the waste gas is used directly after the heat exchanger and before the filter unit, for example for injection into the combustion chamber of a larger solid fuel furnace, e.g. in heating or combined heat and power plants which are fired with solid fuels, e.g. coal.

Fluidized bed firing is particularly advantageous when used in a process to convert moist biomass into fuel, as is disclosed for example in EP 1 443 096 A1 or EP 1 587 899 A1. In this process, the impurities partly adhering to biomass, such as heavy metals adhering as dust and dissolved salts, are washed out specifically before the biomass is further processed into fuel. The combination makes it possible to save the steps "thermal drying" and "pelletizing" from the aforementioned process at least for the part that is used directly for plant operation by generating heat and electricity.

The invention is of course also suitable for a further field of application, if dryer material is already used, in order to dry further materials with the remaining excess heat, which are used outside the plant. The main advantage of the invention is that this is now also possible in the small power range of less than 1 MW and in mobile plants.

BRIEF DESCRIPTION OF THE DRAWING

The FIGURE is a schematic view of an example embodiment of the present invention, where the arrows in the FIGURE indicate the conveying direction of the medium being conveyed in each case; they stand for pipe connections, channels or shafts for fuels or gases.

DETAILED DESCRIPTION

Re: Combustion air 1 is drawn in from the surroundings and preheated via a heat exchanger 2, optionally there is also a further preheating stage 18. After preheating, part of the combustion air 3 is mixed with recirculated exhaust gas 4 and heated in a further heat exchanger 5 before it reaches the pre-combustion stage 6. In pre-combustion 6, the stationary bubble-forming fluidized bed 7 is located in the lower area, above the post-reaction zone 8 (freeboard). The partially burnt exhaust gas 9 extracted from the post-reaction zone 8 is cooled in a heat exchanger 5, whereby the combustion air 4 and the recirculated exhaust gas 5 are heated. The cooled exhaust gas is fed to a dust filter 10. In the dust filter, the dust 11 contained in the exhaust gas is separated, so that dust-free exhaust gas 12 leaves the dust filter for post-combustion 13. In post-combustion 13, a further mixture of combustion air 14 and recirculated exhaust gas 15 is added in order to achieve complete burnout of the exhaust gases from pre-combustion. The burnt-out exhaust gases 16 leave the post-combustion 13 and, if necessary, are cooled with recirculated exhaust gas 17. In a further optional heat exchanger 18, the combustion air 1 is heated, whereby the exhaust gases 16 from the post-combustion are further cooled. After the heat exchanger 18, the exhaust gases pass into an external heat consumer or a working machine 19 (in this example a dryer) in which the wet charge material 20 is pre-dried. The dried charge material 21 is fed to the pre-combustion 6 in the area of the fluidized bed 7. The vapors 22 generated during drying are also fed to pre-combustion 6, but in the area of the post-reaction zone 8. The recirculated exhaust gas is diverted from the exhaust gases 23 after the dryer 19 (4, 15, 17). After diversion, the exhaust gas is passed through another heat exchanger 2, where the first stage of preheating the combustion air 1 takes place. At the end, the exhaust gases 24 leave the system.

If the external heat consumer 19 is not a dryer, the wet charge material 20 is fed directly into the fluidized bed as material flow 21, whereby the material flow of the vapors 22 is omitted.

The invention claimed is:

1. Staggered firing for combustion of moist charge materials, comprising:
pre-combustion in a first combustion chamber designed as a fluidized bed firing, wherein, after pre-combustion, the exhaust gas contains water vapor ($H_2O$), heat transition in a heat exchanger of an air preheater, dust precipitation, and an oxidation of the exhaust gases from the pre-combustion in a post-combustion in a second combustion chamber, characterized in that during the heat transition in the heat exchanger, the exhaust gases from the pre-combustion are cooled and combustion air for pre-combustion is heated and then supplied to the pre-combustion.

2. Staggered firing according to claim 1, characterized in that the combustion air for pre-combustion and/or post-combustion is a mixture of fresh air and recirculated exhaust gas from the post-combustion.

3. Staggered firing according to claim 1, characterized in that the combustion air for pre-combustion in the heat exchanger of an air preheater is heated to at least 200° C., preferably to at least 400° C.

4. Staggered firing according to claim 2, characterized in that the fresh air is preheated for pre- and/or post-combustion in a further heat exchanger by exhaust gas from the post-combustion.

5. Staggered firing according to claim 4, characterized in that part of the thermal energy of the exhaust gas from post-combustion is used for preheating the combustion air before it enters the further heat exchanger.

6. Staggered firing according to claim 5, characterized in that the use of the thermal energy takes place in a dryer in which the moist charge materials are wholly or partially pre-dried.

7. Staggered firing according to claim 6, characterized in that the drying is carried out by means of a contact dryer, in particular a Floradry contact dryer.

8. Staggered firing according to claim 6, characterized in that vapors from the drying process are supplied to the pre-combustion stage.

9. Staggered firing according to claim 8, characterized in that the vapors from the dryer are heated with waste heat from the pre-combustion before they are supplied to the pre-combustion.

10. Staggered firing according to claim 8, characterized in that the exhaust gases from the pre-combustion are passed through the heat exchanger in such a way that they have a temperature of at least 400° C. on entry into the dust filter, preferably on exit from the dust filter.

11. Staggered firing according to claim 10, characterized in that phosphorus and/or further substances are extracted from the ash precipitated in the dust filter.

12. Staggered firing according to claim 10, characterized in that sewage sludge, fermentation residues, leaves, grass cuttings, algae, water hyacinths and/or waste from the food industry are used as moist charge materials.

13. Staggered firing according to claim 1, wherein the heat exchanger is arranged between the first combustion chamber and the second combustion chamber.

* * * * *